INVENTORS
GEORGE A. BAIRD
THOMAS A. DOWDS

May 10, 1966 G. A. BAIRD ETAL 3,250,959

PROGRAM SELECTOR FOR ACCOUNTING MACHINE WITH RECORDING APPARATUS

Original Filed Aug. 15, 1956

3 Sheets-Sheet 2

INVENTORS
GEORGE A. BAIRD
THOMAS A. DOWDS

BY

INVENTORS
GEORGE A. BAIRD
THOMAS A. DOWDS 3,250,959

PROGRAM SELECTOR FOR ACCOUNTING MACHINE WITH RECORDING APPARATUS

George A. Baird, Paoli, and Thomas A. Dowds, Malvern, Pa., assignors to Burroughs Corporation, Detroit, Mich., a corporation of Michigan Original application Aug. 15, 1956, Ser. No. 604,191. Divided and this application May 22, 1962, Ser. No. 206,531
6 Claims. (Cl. 317—137)

This invention which is a division of application Serial No. 604,191, filed August 15, 1956 (now Patent No. 3,069,078) in the names of G. A. Baird and T. A. Dowds entitled "Accounting Machine With Recording Apparatus," assigned to the same assignee as the present invention relates to program selection apparatus for calculating machines of the type employed in accounting and bookkeeping work, and more particularly, although not necessarily exclusive, to program selector apparatus for receiving information from an accounting machine carriage position code switching apparatus for converting such information to a form usable by, e.g., the tape perforator of such accounting machine. More particularly the invention relates to apparatus which institutes activation of the circuitry corresponding to the predetermined program indicated by the carriage position code of an associated accounting machine.

It is an important object, therefore, of the present invention to provide a novel program selecting apparatus for use with calculating machines which also include a recorder or tape output.

Another object of the invention is to provide an automatic program selector for converting carriage position code information to information usable by a tape perforator.

A further object of the invention is to provide an electro-mechanical input output information converting apparatus for use with accounting machines having recording apparatus associated therewith.

For a better appreciation of these and other objects of the invention, reference is made to the following specification and accompanying drawings wherein.

Figures 9, 10:
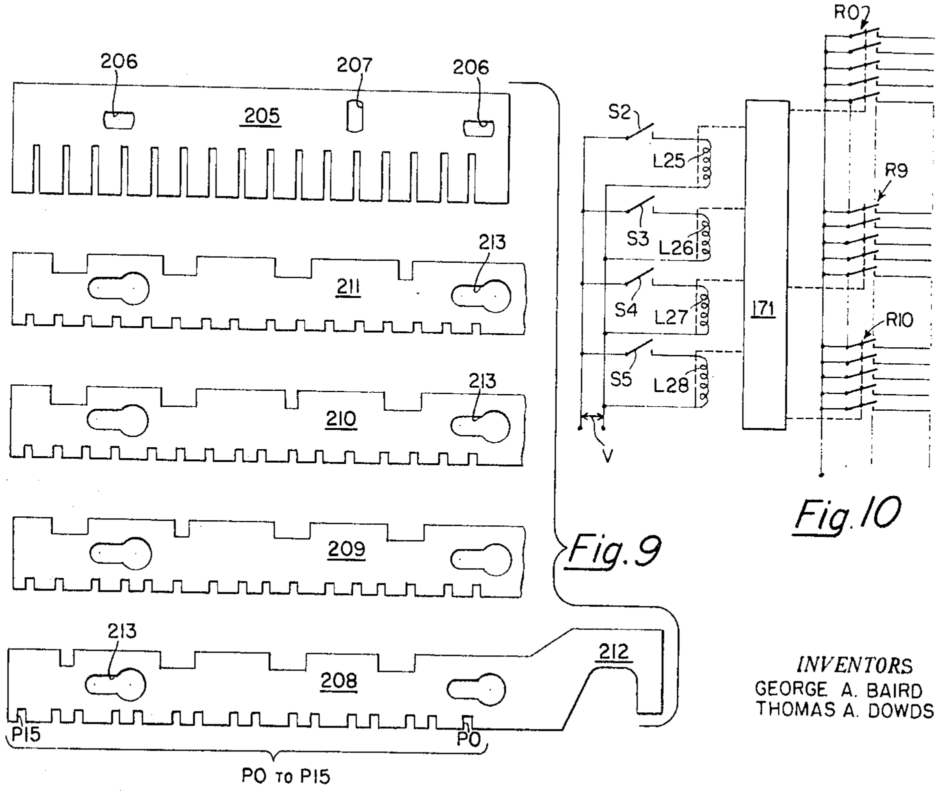
Figure 14:
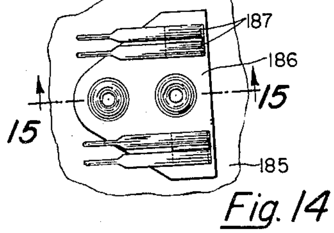
Figure 15:
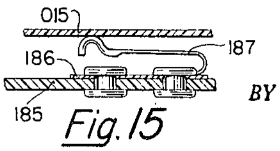
Figure 12:
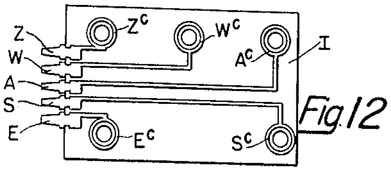
Figure 11:
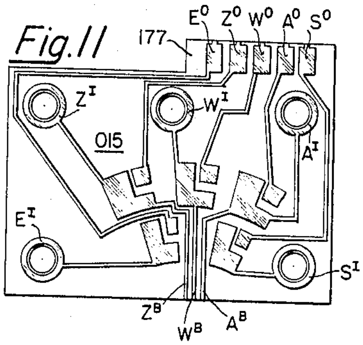
Figure 13:
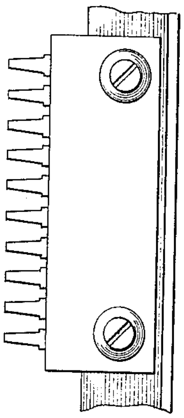
Figure 5:
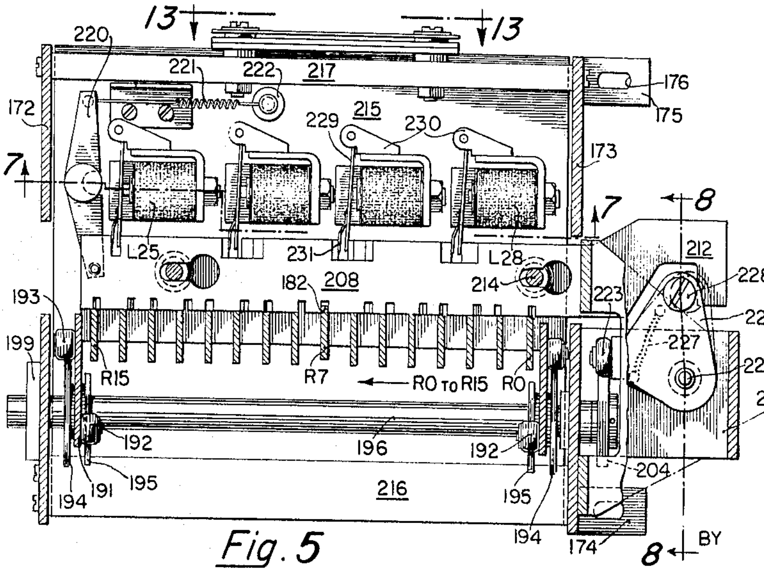
FIGURE 5 is a sectional view taken along the line 5—5 of FIGURE 3 with the view turned 90° in a counterclockwise direction.

FIGURE 9 (see sheet on which FIGURE 1 appears) is an exploded perspective view of certain operating elements of the Program Selector;

FIGURE 10 is a schematic of the electrical circuit for the Program Selector;

FIGURE 11 is an elevational view of a printed circuit panel typical of those used in the Program Selector;

FIGURE 12 is an elevational view of another printed circuit panel;

FIGURE 13 is a view looking in the direction of the arrows on line 13—13 of FIGURE 5;

FIGURE 14 is a fragmentary plan view of the contactor elements operatively associated with the panel shown in FIGURE 11; and FIGURE 15 is a view taken along line 15—15 of FIGURE 14.

PROGRAM SELECTOR

The Program Selector of the present invention is fundamentally a device which receives information from the carriage position code switches 169 and converts this information to a form usable by the Perforator. As its name implies, and through means to be hereinafter discussed, this device is the part of the system which institutes activation of the circuitry corresponding to the predetermined program indicated by the carriage position code of the associated accounting machine. For a more detailed description of the apparatus with which the present selector mechanism is used, reference may be had to Baird et al. 3,069,078 wherein a detailed description of both the accounting machine and the recording apparatus is set forth. The subject matter and disclosure of Baird et al. 3,069,078 is incorporated by reference into the present application.

Figure 7:
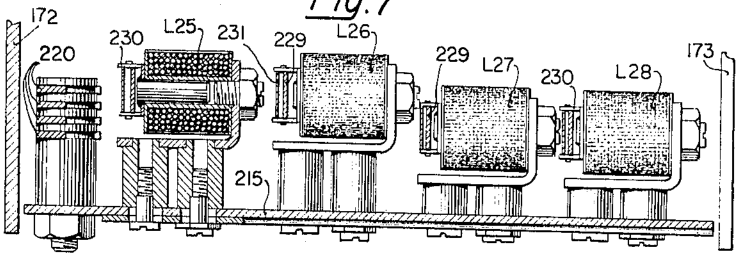
FIGURE 7 is a sectional view taken along line 7—7 of FIGURE 5.

Physically, and in its simplest form the Program Selector comprises sixteen groups of five-pole relays, it being possible to energize only one of these five-pole relays during any one cycle. As is shown schematically and in simplified form in FIGURE 10, the carriage position code switches S2 through S5 corresponding to electrical lanes 2 through 5, are connected in parallel across a source of voltage V and are associated respectively with solenoids L25 through L28 of the Program Selector as seen in FIGURES 5 and 7. It may therefore be seen that through selective closure of the switches, sixteen distinct combinations of energized and de-energized solenoids, ranging from none energized to all energized, may be achieved. The specific combination of energized and de-energized solenoids resulting from the predetermined selective closure of switches S2 through S5 will cause the closure through means indicated symbolically at 171 in FIGURE 10, and to be discussed in detail hereinafter, of one of the previously mentioned five-pole relays R0 through R15, while at the same time preventing the closure of any of the other relays. It should be noted that while sixteen relays are present in the device, only three, R0, R9, and R10 have been indicated in FIGURE 10, the others having been omitted from this figure for purposes of clarity.

Figure 1:
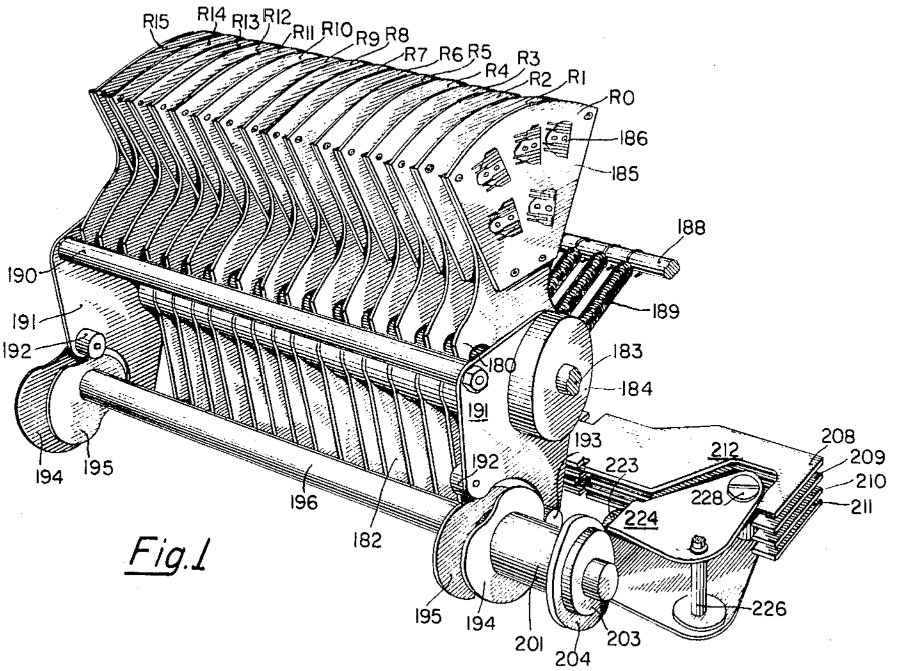
FIGURE 1 is a perspective view of the Program Selector.
Figure 2:
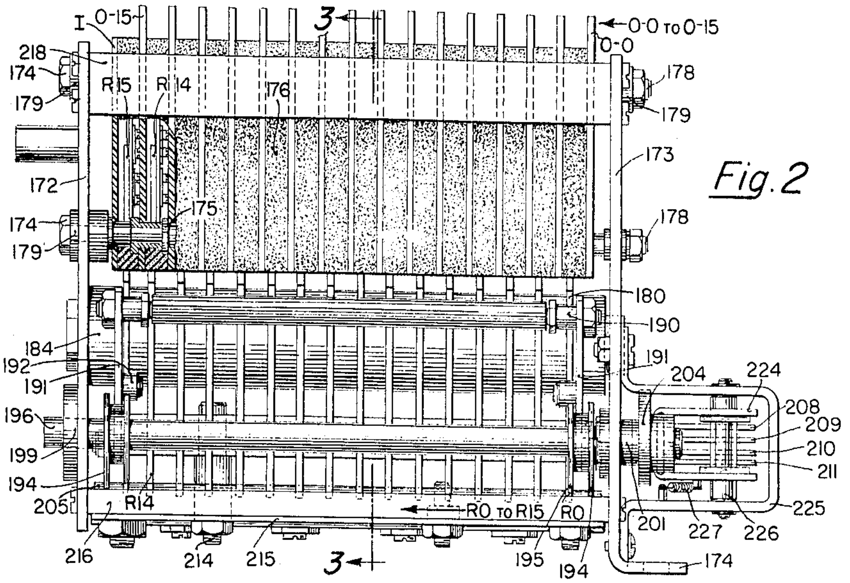
FIGURE 2 is a front elevational view of the Program Selector.

Referring now more particularly to FIGURE 2 which is a front elevational view of the program selector, it may be seen that this device comprises a pair of end plates 172 and 173. The plate 173 has a pair of outwardly turned ears 174 and 175, best illustrated in FIGURE 8, each containing an elongated slot 176 utilized in attaching the program selector to the perforator frame. Sixteen output printed circuit cards O–0 to O–15 (FIGURE 2), an input card I as well as the sixteen previously mentioned five pole relays (FIGURE 1) hereinafter called Rotors, R0–R–15 are contained between and supported by the end plates.

The output cards, all of which are identical in configuration, are exemplified by O–15 illustrated in FIGURE 11. As shown therein, the card is of substantially rectangular shape having a raised section along the right portion 177 of its upper edge. The card itself is composed of nonconductive material on which the conductive circuits are placed in conventional manner. There are five circuits, S, A, W, Z, and E, representing Sequence, Auxiliary Control, Word Length, Zero to Space and Exceed Capacity, on each card. The inputs to the various circuits occur at the ring-shaped portions $S^I$, $A^I$, $W^I$, $Z^I$, and $E^I$ which are respectively concentric with five perforations in the card. Each circuit has an enlarged portion in which a discontinuity occurs and then continues on to the output tabs $S^0$, $A^0$, $W^0$, $Z^0$, and $E^0$ located on the above mentioned raised section of the card. It should additionally be noted that the Auxiliary Control, Word Length and Zero to Space circuits each have a branch $A^B$, $W^B$, and $Z^B$ respectively, extending from the enlarged input side of each of these circuits to the lower edge of the card to facilitate plating of the wiring.

The input or common card I, best illustrated in FIGURE 12A is of substantially rectangular configuration and is composed of a non-conductive material. Five taper tab terminals of conventional design are riveted or otherwise attached to a vertical edge of the card. These terminals Z, W, A, S, and E are respectively electrically connected to the five printed common input circuits which terminate in the ring shaped portions $Z^c$, $W^c$, $A^c$, $S^c$, and $E^c$, each concentric with a perforation in the card.

Five supporting shafts 178 having threaded extremities extend transversely across the Program Selector, each passing through a corresponding one of the perforations in the above mentioned input and output cards so as to support the cards, and also through registering holes in the end plates 172 and 173, with nuts 174 screwed on to the threaded extremities of the shafts so as to prevent relative movement between the latter and their associated cards and plates.

Bushings 175 each having a flanged end are placed on the above mentioned shafts in end to end contiguous relationship with the above mentioned cards interposed therebetween as is best illustrated in FIGURE 2, so that the underside of the flanges abut the hereinbefore mentioned ring shaped portions of the circuits on the various cards. Accordingly, all of the output cards O–0 to O–15 are electrically connected in parallel to the input card I and any voltage applied to any of the taper tabs of card I will be tranmitted across the associated printed circuit to the corresponding one of its ring shaped portions $Z^c$, $W^c$, $A^c$, $E^c$, and $S^c$, where it will be applied to the flange of the abutting bushing 175. The voltage will then be transmitted in turn by each bushing to the one next adjacent. As the flange of each bushing abuts a ring shaped portion on its associated card, the voltage will be applied to the input side of the corresponding printed circuit of each of the output cards O–0 to O–15. The bushings also serve the additional function of spacing the various cards the desired distance apart.

Figures 3, 4:
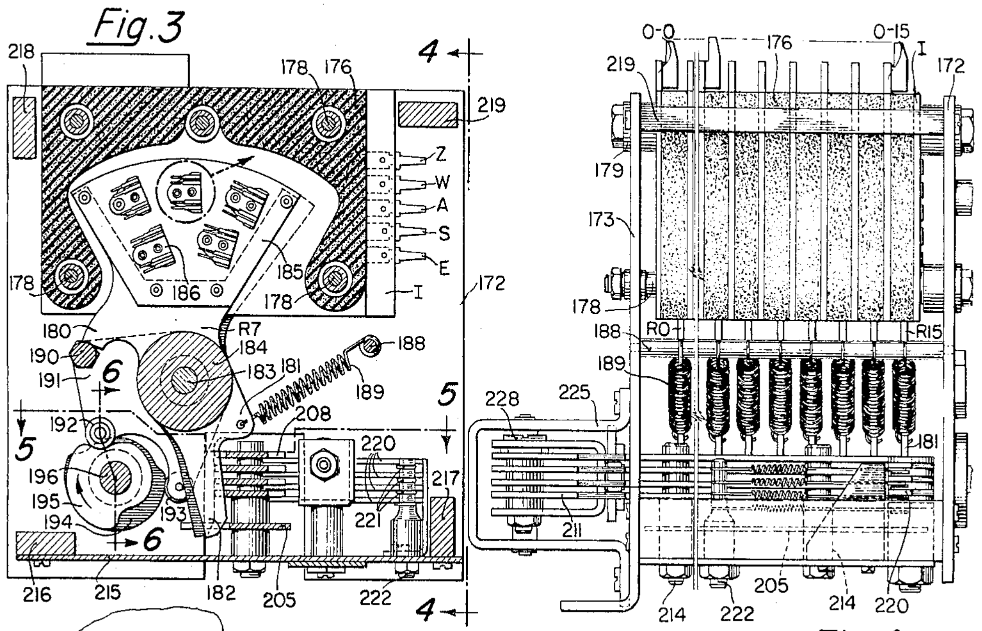
FIGURE 3 is a sectional view taken along the line 3—3 of FIGURE 2.
FIGURE 4 is a view looking in the direction of the arrows on line 4—4 of FIGURE 3 and with parts broken away.

Dust guards 176 composed of sponge rubber on any other suitable material and having the configuration indicated in FIGURE 3 are inserted between the cards in order to prevent the entrance of foreign matter. In order to maintain the dust guards fixedly in place, certain of shafts 178 are inserted through registering holes in said guards.

The above described card assembly is maintained insulated from the end plates 172 and 173 by the interposition of bushings 179 between the extremities of the shafts 178 and the end plates. The bushings 179 may be composed of fiber, ceramic or any other suitable non-conductive material.

It may be seen in FIGURE 1, which is a perspective view of the rotor assembly, as well as in FIGURE 3, that each rotor comprises a substantially elongate member having a sector-shaped upper portion and a forwardly extending abutment ear 180 therebelow. A protrusion 181 having a perforation therein for anchoring one of the extremities of a spring, the purpose of which will be hereinafter discussed, extends rearwardly from the lower central portion of the rotor, while an elongated tooth 182 forms the lowermost portion of the rotor which also contains a centrally located perforation utilized in mounting the rotors upon shaft 183. Bushings 184 are interposed between the rotors in order to space the latter the desired distance apart, as is best illustrated in FIGURE 2.

A non-conductive sector-shaped switching member 185 is riveted or otherwise fixedly attached to the upper sector-shaped portion of each rotor, as is best illustrated in FIGURES 3, 14 and 15. Five discrete switching elements 186 composed of conductive material and having a pair of resilient contact members 187 at each extremity thereof are riveted to each switching member in a special relationship corresponding to that of the enlarged portions of the circuits illustrated in FIGURE 11.

A shaft 188 extending transversely of the program selector and having its respective ends set in the end plates 172 and 173 is utilized to anchor a series of springs 189, each spring being connected to one of the rotors R0 to R15. The shaft 188 contains sixteen undercut portions each being of a width substantially similar to the gauge of the metal comprising the spring. These undercut portions are spaced apart a distance equal to that of the rotors so that when the springs are anchored to undercut portions of said shaft they are maintained a like distance apart. The opposite end of each spring is anchored to the perforation in the protrusion 181 of its corresponding rotor, and will therefore urge the rotor in a counterclockwise direction so that the abutment ears 180 will be normally maintained in contact with a shaft 190 which extends transversely across the program selector as is illustrated in FIGURE 3.

Figure 6:
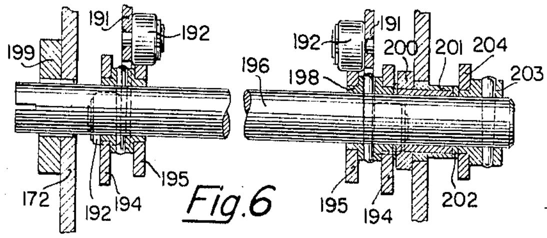
FIGURE 6 is a fragmentary sectional view taken along line 6—6 of FIGURE 3.

The opposite extremities of shaft 190 are fixedly attached to cam followers 191, each of which carries a pair of rollers 192 and 193 respectively. Each pair of rollers operatively engage a pair of complementary cams 194 and 195 mounted for rotation with the drive shaft 196. Specifically, and as is illustrated in FIGURE 6, the leftward cams 194 and 195 are press fitted upon a bushing 197 which is in turn pinned to the shaft 196 proximate to its left extremity. Similarly the rightward cams 194 and 195 are press fit upon a bushing 198 which is pinned to the rightward extremity of the drive shaft 196. The shaft itself is journalled for rotation between the end plates 172 and 173, a bushing 199 being keyed to the leftward extremity of the shaft, while a pair of bushings 200 and 201 are press fit upon the bushing 198 and a washer 202 is located on the shaft 196 immediately outboard of the bushings 198 and 201 respectively. Immediately outboard of the washer is an additional bushing 203 having a flange thereupon. This bushing carries a cam 204 which will be discussed in detail hereinafter and is also pinned to the drive shaft 196.

Referring now more particularly to FIGURE 3, it may be seen that the springs 189 will urge their associated rotors in a counterclockwise direction so that the abutment ears 180 engage the shaft 190 which is, as hereinbefore mentioned, fixedly connected to the cam followers 191. At the commencement of a cycle the complementary cams 194 and 195 are caused to rotate in a clockwise manner by the drive shaft 196. This will result in the presentation of the high portion of the cams to the roller 192 causing the follower 191, and therefore the shaft 190, to rotate in a clockwise direction. The rotors R0 to R15 will move in a similar direction so that the ears 180 are maintained in engagement with the shaft 190. Later in the cycle when the high portion of the cams are in contact with the follower 193, the shaft 190 and its associated followers 191 are caused to move in a counterclockwise direction, and the rotors, from the urge of springs 189 are caused to move in a similar direction.

An exploded view of the four coded slides and their associated guide plate is illustrated in FIGURE 9. The guide plate 205 comprises a rectangular member having sixteen elongated slots along one of its longitudinal edges, and a pair of longitudinally extending slots 206 in addition to a laterally extending slot 207 located intermediate the previously mentioned longitudinal slots. The slots 206 and 207 are utilized in properly locating the guide in the program selector. The four coded slides 208 through 211 respectively, are also substantially rectangularly-shaped members, each having a hook-shaped portion 212 at one of its extremities, only that hook on slide 208 in FIGURE 9 being illustrated. Each of the coded slides has sixteen stub notches P0–P15 along one longitudinal edge and an additional four notches along the opposite longitudinal edge. It should be noted that whereas the elongated slots in the guide plate are all equidistantly spaced the stub notches in the coded slides are spaced irregular distances apart for purposes to be hereinafter explained. It should further be noted that of the four slots on the opposite longitudinal edge of each coded slide, one of the four is relatively narrow while the other three are wider.

In FIGURE 9, the leftmost of the last mentioned slots is the narrow one in slide 208, while it is the second from the left in 209, the third in 210 and the rightmost in 211. The purpose of these configurations will also be discussed hereinafter. Additionally, each of the slides contains a pair of axially extending elongated perforations 213 having enlarged ends. The coded slides and their associated guide plate 205 are assembled on a pair of studs 214, each of which extends inwardly from a plate 215 screwed to bracing members 216 and 217, which are in turn fastened to the side plates 172 and 173, as is best illustrated in FIGURES 3 and 4.

A similar pair of bracing members 218 and 219 extend across the upper ends of the side plates and are fastened thereto, as is also illustrated in FIGURES 3 and 4. The coded slides and guide plate are located in their proper relative positions on the studs by the interposition of spacer bushings. Additionally, and because of the elongated slots in the coded slides, a sliding fit is maintained and therefore relative movement between the studs and the slides is made possible.

As is best seen in FIGURES 5 and 7, four rocker arms 220 are mounted in spaced relationship upon a stud extending inboard from plate 215. The arrangement is such that each of the rocker arms is located over one of the coded slides 208 to 211. Four springs 221, each having one of its ends anchored to a stud 222, and its opposite end to one of the extremities of rocker arm 220, tend to cause the arms to rotate in a clockwise direction as viewed in FIGURE 5. As is also seen therein, the opposite extremity of each rocker arm is pin connected to its associated coded slide, the end result being that the coded slides are urged to the left, as viewed in FIGURE 5.

As was previously mentioned, the cam 204 is mounted proximate to the right extremity of the drive shaft 196. This cam is operatively associated with a follower 223 which is attached to a channel-shaped crank arm 224, as is best illustrated in FIGURES 1 and 5. The crank arm is pivotally mounted within a guard member 225 by means of shaft 226, the guard member being fixedly attached to end plate 173. A spring 227 having its opposite ends anchored to the crank arm and guard respectively, tends to urge the crank arm in a clockwise direction, as viewed in FIGURE 5 so as to maintain the follower 223 in engagement with cam 204.

As was previously mentioned, the rocker-arm or bell-cranks 220 and springs 221, urge the coded slides 208 to 211 leftward as viewed in FIGURE 5 so as to maintain the hook-shaped portions 212 of said slides in engagement with a pin 228 extending transversely across said hook-shaped portions, and being mounted between the noses on the respective arms of the channel-shaped crank arm 224. The arrangement is such that as the drive shaft 196 rotates, the cam 204, through the follower 223, will rock the crank arm 224 first in a clockwise direction, and then permit it to return under the urging of its spring 227 in a counterclockwise direction. Therefore, and by means of pin 228, the coded slides 208 to 211 are first urged to move rightwardly against the resistance of springs 221, and are then later in the cycle permitted to return to their home positions under the urging of said springs.

As best seen in FIGURES 5 and 7, the four solenoids L25 to L28 previously mentioned in relation to FIGURE 10, are mounted in cantilever fashion, each by means of a pair studs from the plate 215. Associated with each solenoid is a clapper 229 pivotally mounted upon a bracket 230.

The solenoids, when energized, normally do not have the strength to attract the clappers through an air gap, but do have sufficient strength to maintain the clappers in position against the resistance of springs 221 if the clappers have previously been moved into abutting relationship with the armatures of the solenoids. The operative connection between the clappers and springs 221 will be explained hereinafter.

As illustrated in FIGURE 5, an additional spring 231 is riveted to the forward end of each clapper and is maintained in spaced relationship from said clapper. As seen therein, the forward ends of the various clappers extend into the areas encompassed by the four notches along the longitudinal edge of the coded slides. It may be recalled that each coded slide has one narrow notch and three wide notches. The arrangement is such that the clapper associated with solenoid L25 is operatively engaged with the narrow notch of coded slide 208. The spring 231 of this clapper abuts one edge of the notch while the clapper itself abuts the opposite edge. Accordingly no freedom of movement will be permitted between the clapper and the slide. However, the width of the corresponding notch in each of the slides 209, 210, and 211 is sufficient so that the latter slides may move to the full extent of their permissible sliding movement without either of the edges of said notches in any way engaging the clapper of solenoid L25 or its spring. The same relationship exists between the clapper of solenoid L26 and the second, or narrow notch, of coded slide 209, while the clapper of solenoid L27 is operatively associated with the narrow or third notch of slide 210 and the fourth notch of slide 211 is operatively associated with the clapper of solenoid L28. Accordingly, any movement of slide 208 will be reflected in a corresponding rotation of the clapper of solenoid L25 and similarly with respect to solenoids L26, L27, and L28 in association, respectively with slides 209, 210, and 211. Conversely, if the clappers or any of them are held stationary, the associated slide will obviously be immobilized.

Referring now again to FIGURE 9, as well as to FIGURE 5, it may be recalled that the sixteen stub notches P0–P15 along the longitudinal edge of various slides are spaced irregular distances apart. The dimensions are such that when the slides are moved to the extremities of their rightward or leftward permissible movement, in any random order, only one set of stub notches will be in alinement with the corresponding elongated guide notch in the guide plate 205, while all the remaining sets of stub notches will be in misalinement. As an example, assuming that slide 208 is held at the rightward limit of its permissible movement while slides 209, 210, and 211 are at the leftward limit of their permissible movement, in this case the P1 stub notches in slides 208, to 211, as viewed in FIGURE 9, will all be in alinement with the corresponding elongated notch in guide plate 205. As to the corresponding sets of notches in the other fifteen positions, at least one of the four notches in each position will be misalined.

Assuming that a program is desired which corresponds to a carriage position code indicated by the closure of switches S2, S3, and S4 of FIGURE 10, and that the last selected program corresponds to closure of none of these switches (which means that rotor R0 is in the selected position with tooth 182 in the alined stub notches P0), the program selector operates as follows: the accounting machine motor bar is depressed causing the drive shaft 196 to rotate. Rotation of shaft 196 and its associated cams 194 and 195 first causes shaft 190 to rock rotor R0 through 6°, so that its ear 180 and tooth 182 are alined with the corresponding parts of the other rotors. This frees the slides 208 to 211 permitting their movement for selection of a subsequent program. Continued rotation of shaft 196 causes a slight further rotation of all the rotors to provide clearance for the movement of the slides 208 to 211. Simultaneously with this further rotation, shaft 196 through cam 204 causes crank arm 224 to rock in a clockwise manner, as illustrated in FIGURE 5. Also, at this time the solenoids L25, L26, and L27 are energized. Such motion of the crank arm will cause the coded slides 208 to 211 to move rightward, as viewed in FIGURE 5, against the resistance of springs 221. Such movement will cause the clappers 229 of the various solenoids to be urged into contact with the armatures of said solenoids because of the engagement of the forward end of the clappers with the narrow notches of their associated slides.

Figure 8:
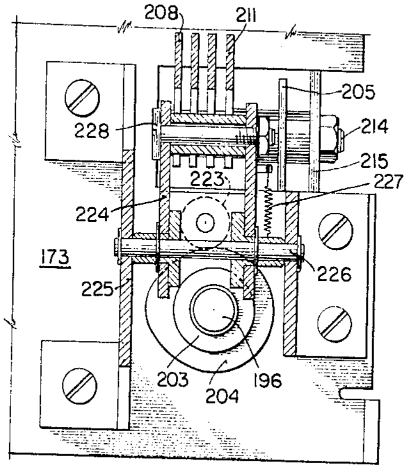
FIGURE 8 is a sectional view taken along line 8—8 of FIGURE 5.

It should be recalled that the solenoids when energized, have the strength to maintain the clappers in engagement with the armatures against the resistance of the springs 221, but they do not have sufficient strength to draw the clappers into said contact through an air gap. With solenoids L25, L26, and L27 energized their associated clappers will be held in the contact position while the remaining clapper will be free to return to its normal position when the slides move leftward. This latter motion occurs subsequently in the cycle as may be indicated by the configuration of the cam 204, as illustrated in FIGURE 8. When the low side of said cam presents itself to the follower 223, the spring 227 urges the crank arm 224 in a counterclockwise direction permitting the springs 221 and bell crank 220 to return, or attempt to return, their associated slides to the normal leftward position. In the instant example slide 211 is free to so return, however, the slides 208 to 210, due to the energization of their associated solenoids and clappers are held in the rightward position. As a result, the slide 211 will be in its extreme leftward position because of its being permitted to return while the slides 208 to 210 are held in the rightward position by their clappers. This will cause the stub notches P7 to be in alinement while all other sets of stub notches are in misalinement. All of the above described events occur while the rotors R0 to R15 are being rocked in a clockwise direction as viewed in FIGURE 3.

At this time complementary cams 194 and 195 cause shaft 190 to reverse direction allowing the rotor springs 189 to move the rotors in a counterclockwise direction. This counterclockwise rotation continues until such time as the elongated teeth 182 of said rotors reach the plane defined by the leading edge, that is, the edge containing the stub notches, of the coded slides. In the case of the rotor R7, the corresponding stub notches are all in alinement. However, at the position corresponding to each of the other fifteen rotors, at least one of the stub notches is misalined. Accordingly, as the complementary cams 194 and 195 continue to rotate, rotor R7 will move therewith under the urging of its spring 189 until such time as its elongated tooth 182 is fully seated within the four stub notches P7 as is illustrated in FIGURES 3 and 5. However, the other fifteen rotors will stop short of this position due to their abutment against the edge of the slide or slides having the misalined notch or notches corresponding to their position. As a result of the full rotation of the rotor R7, its spring contacts 187 will have moved into a position where they respectively bridge the discontinuities in the enlarged portion of the five circuits on the corresponding output card O–7, however, the remaining fifteen rotors have been stopped short of this position and therefore their associated spring contacts will have failed to bridge the discontinuities on the corresponding output cards.

Accordingly, and solely, in the case of the output card O–7, electrical continuity will exist from the input rings $Z^I$, $W^I$, $A^I$, $E^I$, and $S^I$, respectively to the corresponding output tabs $Z^0$, $W^0$, $A^0$, $E^0$, and $S^0$. Therefore the voltages applied to the tabs Z, W, A, S, and E of the input card I will appear on the output tabs of card O–7. No such voltage will be present on the output tabs of the remaining fifteen output cards. The manner in which the voltages are applied to tabs Z, W, A, S, and E, and the manner in which they are utilized at output $E^0$, $Z^0$, $W^0$, $A^0$, and $S^0$ is fully discussed in the following electrical portion of this case.

After the selected rotor R7, has seated in the stub notches of the slides, the solenoids L25, L26, and L27 are deenergized. The selected rotor will remain in this position until a new cycle is initiated.

There has thus been described a new and useful apparatus for receiving carriage position information from an accounting machine and converting this information into a form usable an operably associated perforating accessory.

What is claimed is:

1. Program selector apparatus for a recording machine capable of operation under a plurality of different, variable, presettable, input and output programs comprising,
(a) input printed circuit means,
(b) one or more output circuit means including printed conductive output circuits thereon,
(c) one or more arcuately movable circuit closing rotor members intermediate said input and said output circuit means,
(d) conductive means operably associated with each circuit closing member for interconnecting said input printed circuit means to a selected output circuit in a desired arrangement as a result of the movement of said arcuately movable rotor members,
(e) a plurality of coded slides operably associated with said rotor members,
(f) drive means operably connected to the main driving means of said recording machine for moving said slides and said rotor members in a direction in accordance with the selected input program,
(g) means for returning said slides and said rotors to a home position, and
(h) an operating electromagnet for each slide, each said electromagnet representing a program under which the recording machine is adapted to operate.
(i) means connecting said electromagnets to a source of energizing signal potential for selectively energizing the same in accordance with a preselected input program, either singly or in combination,
(j) each electromagnet including means engageable with a respective coded slide for detenting the slide in a selected position and causing a desired one of the output printed circuits to be selected for energization during each cycle of the machine operation effectively determining under which program the recording machine is to operate.

2. Program selector apparatus for a recording machine capable of operation under a plurality of different, variable, presettable, input and output programs comprising,
(a) input printed circuit means,
(b) one or more printed circuit members including printed conductive output circuits thereon,
(c) one or more arcuately movable circuit closing rotor members,
(d) conductive means operably associated with each movable rotor member for selectively interconnecting said input printed circuit means to an output circuit in a desired arrangement as a result of the movement of said arcuately movable rotor members,
(e) a plurality of coded slides operably associated with said rotor members, each of said slides including a plurality of notches and projections arranged along opposite parallel edges thereof, the arrangement of said notches and projections representing selectable programs under which the recording machine is adapted to operate, (f) drive means operably connected to the main driving means of said recording machine for moving said slides in a direction in accordance with the selected input program, (g) means for returning said slides to a home position, (h) an operating electromagnet for each slide, (i) means connecting each said electromagnet to a source of energizing signal potential for selectively energizing the same in accordance with a preselected input program, either singly or in combination, (j) each electromagnet including means engageable with a respective coded slide for detenting the slide in a selected position during each cycle of the machine operation effectively determining under which program the recording machine will operate, and (k) means on said rotor members operably interengageable with the notches of said slides permitting a selected rotor member to assume a selected circuit closing position in its arcuate path of movement relative to said input and output circuit members.

3. The invention in accordance with claim 2 wherein said conductive means operably associated with each movable rotor member comprises pairs of substantially U-shaped contact members including arcuate contact making end portions adapted to move across the printed conductive circuits of said output means effectively bridging and closing the selected circuits at the terminations of the arcuate movement thereof.

4. Program selector apparatus for a recording machine capable of operation under a plurality of different, variable, presettable, input and output programs comprising, (a) fixed input printed circuit means, (b) one or more printed circuit members including printed conductive output circuits thereon, arranged in parallel spaced relation relative to said sector members, (c) a plurality of parallel, spaced arcuately movable wedge shaped circuit closing sector members, (d) conductive means operably associated with each movable sector member adapted to selectively interconnect said input printed circuit means to an output circuit in a desired arrangement as a result of the rotational movement of said sector members, (e) means for moving said sector members to circuit closing positions, (f) a plurality of notched coded slides operably associated with said sector members, (g) an operating electromagnet for each slide, each said electromagnet representing a program under which the recording machine is adapted to operate, (h) drive means operably connected to the main driving means of said recording machine for moving said slides and said sector moving means in a direction in accordance with the selected input program, (i) means for returning said rotors and said slides to home position, and (j) means connecting said electromagnets to a source of energizing signal potential for selectively energizing the same in accordance with a preselected input program, either singly or in combination, (k) each electromagnet including means engageable with a respective coded slide for detenting the slide in a selected position and causing a desired one of the output printed circuits to be selected for energization during each cycle of the machine operation effectively determining under which program the recording machine will operate.

5. The invention in accordance with claim 4 wherein said means for moving said sector members to circuit closing positions includes oppositely disposed pairs of complementary cams actuated by the main drive of the machine and pairs of follower rollers coupled thereto.

6. Program selection apparatus for a recording machine capable of operation under a plurality of different, variable, presettable, input and output programs comprising, (a) input printed circuit means including a plurality of printed conductive circuits thereon, (b) one or more circuit members having printed conducting output circuits thereon arranged in parallel spaced relation, (c) one or more arcuately movable rotor members disposed in parallel spaced relation interleaved with respect to said output circuit members, each rotor member including an elongated projection integral therewith, (d) conducting means operably associated with each rotor member for selectively interconnecting said input circuit means with an output circuit, (e) one or more parallel spaced rectilinearly movable coded notched slides operably associated with said rotor members, (f) an operating electromagnet for each slide, each said electromagnet representing a program under which the recording machine can operate, (g) drive means operably connected to the main driving means of said recording machine for moving said slides and said rotors in directions to align certain of the notches of said slides enabling the projection of a selected rotor to seat therein effectively orienting the conducting means of said rotors so as to interconnect said input means with an output circuit as a result of the rotational movement of said arcuately movable rotor member, (h) means connecting said electromagnets to a source of energizing signal potential for selectively energizing the same in accordance with the desired input program, and (i) means operably associated with each electromagnet engageable with a respective coded slide for detenting the same in the selected position.

References Cited by the Examiner

UNITED STATES PATENTS

| | | | |
|---|---|---|---|
| 2,323,824 | 7/1943 | Maschmeyer | 235—61.6 |
| 2,606,236 | 8/1952 | Oberman | 317—140 |
| 2,715,950 | 8/1955 | Law | 317—139 |
| 2,735,887 | 2/1956 | Goetz | 340—357 X |
| 2,756,931 | 7/1956 | Drillick | 235—61.6 |
| 2,797,260 | 6/1957 | Roschke | 340—357 |
| 2,896,047 | 7/1959 | Breitenstein | 317—141 X |
| 2,899,676 | 8/1959 | Rivers et al. | 200—104 X |
| 2,935,923 | 5/1960 | Baumbach et al. | 317—137 |
| 3,109,922 | 11/1963 | Minard | 317—137 |

SAMUEL BERNSTEIN, *Primary Examiner.*

D. J. YUSKO, *Assistant Examiner,*